(12) United States Patent
Terada

(10) Patent No.: US 11,719,299 B2
(45) Date of Patent: Aug. 8, 2023

(54) PLATE SPRING MEMBER

(71) Applicant: NHK SPRING Co., Ltd., Yokohama (JP)

(72) Inventor: Yusuke Terada, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/041,011

(22) PCT Filed: Mar. 28, 2019

(86) PCT No.: PCT/JP2019/013768
§ 371 (c)(1),
(2) Date: Sep. 24, 2020

(87) PCT Pub. No.: WO2019/189644
PCT Pub. Date: Oct. 3, 2019

(65) Prior Publication Data
US 2021/0115993 A1 Apr. 22, 2021

(30) Foreign Application Priority Data
Mar. 28, 2018 (JP) .................. 2018-061191

(51) Int. Cl.
*F16F 1/32* (2006.01)
(52) U.S. Cl.
CPC ........... *F16F 1/32* (2013.01); *F16F 2226/02* (2013.01); *F16F 2228/08* (2013.01); *F16F 2238/022* (2013.01)

(58) Field of Classification Search
CPC .... F16F 1/32; F16F 2226/02; F16F 2228/004; F16F 2228/08; F16F 2230/02; F16F 2234/06; F16F 2238/022; C21D 7/06; Y10T 29/479
USPC .......... 267/158, 159, 161, 162, 163
See application file for complete search history.

(56) References Cited

U.S. PATENT DOCUMENTS

| | | | | |
|---|---|---|---|---|
| 6,415,486 B1 * | 7/2002 | Prevey, III | ................ | B23P 9/02 29/90.01 |
| 6,790,294 B1 * | 9/2004 | Ishida | ..................... | B24C 1/086 148/212 |
| 7,284,308 B2 * | 10/2007 | Akeda | ...................... | C21D 7/06 29/90.7 |
| 2004/0016278 A1 * | 1/2004 | Douman | ............... | F16D 13/583 72/53 |

(Continued)

FOREIGN PATENT DOCUMENTS

| | | | | |
|---|---|---|---|---|
| CN | 1607995 A | * | 4/2005 | ............... C21D 7/06 |
| CN | 101691884 A | | 4/2010 | |

(Continued)

OTHER PUBLICATIONS

Machine translation, JP 2000313938 A. (Year: 2000).*

(Continued)

*Primary Examiner* — Thomas J Williams
(74) *Attorney, Agent, or Firm* — Cantor Colburn LLP

(57) ABSTRACT

A plate spring member having a compressive residual stress distribution in which a compressive residual stress of at least part of a portion having a depth from a surface within 50 μm is 500 MPa or more, and the compressive residual stress of a portion having a depth from the surface exceeding 50 μm is less than 500 MPa.

6 Claims, 4 Drawing Sheets

(56) References Cited

U.S. PATENT DOCUMENTS

| | | | |
|---|---|---|---|
| 2005/0029721 A1 | 2/2005 | Muhr et al. | |
| 2008/0006351 A1* | 1/2008 | Bernfried et al. | |
| 2021/0115993 A1* | 4/2021 | Terada | F16F 1/32 |
| 2022/0025493 A1* | 1/2022 | Neishi | C21D 8/065 |

FOREIGN PATENT DOCUMENTS

| | | | | |
|---|---|---|---|---|
| CN | 102472344 A | | 5/2012 | |
| CN | 107000162 A | | 8/2017 | |
| CN | 107654550 A | | 2/2018 | |
| DE | 102006051683 A1 | * | 5/2008 | ............... C21D 7/06 |
| EP | 2735755 A | | 5/2014 | |
| GB | 2352202 A | * | 1/2001 | ............... B24C 1/10 |
| JP | 2000027915 A | | 1/2000 | |
| JP | 2000313938 A | * | 11/2000 | |
| JP | 2001009725 A | * | 1/2001 | |
| JP | 2004144132 A | | 5/2004 | |
| JP | 2005054995 A | | 3/2005 | |
| JP | 2006258239 A | * | 9/2006 | |
| JP | 2008002683 A | | 1/2008 | |
| JP | 4808424 B2 | | 8/2011 | |
| JP | 2013024284 A | | 2/2013 | |

OTHER PUBLICATIONS

International Search Report for International Application No. PCT/JP2019/013768.
CNOA First Office Action for corresponding CN Application No. 201980021385.0; dated Jul. 13, 2021.
International Search Report for International Application No. PCT/JP2019/013768 dated Jun. 4, 2019.

\* cited by examiner

PLATE SPRING MEMBER

CROSS REFERENCE TO RELATED APPLICATIONS

This is the U.S. national stage of application No. PCT/JP2019/013768, filed Mar. 28, 2019. Priority under 35 U.S.C. § 119(a) and 35 U.S.C. § 365(b) is claimed from Japanese Application No. 2018-061191, filed Mar. 28, 2018, the disclosure of which is also incorporated herein by reference.

TECHNICAL FIELD

The present invention relates to a plate spring member. Priority is claimed on Japanese Patent Application No. 2018-061191, filed Mar. 28, 2018, the content of which is incorporated herein by reference.

BACKGROUND ART

In the related art, a plate spring member formed by processing a plate-shaped metal material such as a plate spring, a disc spring or a wavy spring has been used. Patent Document 1 described below discloses that shot peening is performed on this type of plate spring member to generate a compressive residual stress on a surface of the plate spring member and improve the fatigue strength of the plate spring member.

CITATION LIST

Patent Document

[Patent Document 1]
Japanese Patent No. 4808424

SUMMARY OF INVENTION

Technical Problem

There is demand for this type of plate spring member to have improved sagging resistance, in addition to fatigue strength.

The present invention has been made in view of such circumstances, and an object thereof is to provide a plate spring member having improved settling resistance in addition to durability.

Solution to Problem

A first aspect of the present invention is a plate spring member including a compressive residual stress distribution in which a compressive residual stress of at least part of a portion within a depth of 50 μm from a surface is 500 MPa or more, and a compressive residual stress of a portion exceeding a depth of 50 μm from the surface is less than 500 MPa.

According to the first aspect, since a large compressive residual stress exceeding 500 MPa is imparted to the vicinity of the surface of the plate spring member, the fatigue strength increases. Furthermore, since a large compressive residual stress exceeding 500 MPa is not imparted to a deep portion of the plate spring member having a depth from the surface exceeding 50 μm, deterioration in sagging resistance due to compressive residual stress is curbed. Therefore, according to the plate spring member of the first aspect, it is possible to improve the settling resistance in addition to the durability.

In a second aspect of the present invention, the plate spring member of the first aspect may have a compressive residual stress distribution in which the compressive residual stress of at least part of a portion having a depth from the surface within 30 μm is 500 MPa or more, and the compressive residual stress of a portion having a depth from the surface exceeding 30 μm is less than 500 MPa.

According to the second aspect, since a large compressive residual stress exceeding 500 MPa is imparted to the vicinity of the surface of the plate spring member, fatigue strength increases. Further, since a large compressive residual stress exceeding 500 MPa is not imparted to the deep portion of the plate spring member having the depth from the surface exceeding 30 μm, degradation of settling resistance due to the compressive residual stress is suppressed. Therefore, according to the plate spring member of the second aspect, it is possible to improve the settling resistance in addition to durability.

According to a third aspect of the present invention, in the plate spring member of the first aspect, when a difference in compressive residual stress between two points having a depth from the surface of 0 μm and 50 μm is defined as $\Delta\sigma$, and a difference in depth from the surface between the two points is defined as $\Delta z$, a value of a residual stress gradient I defined by $I=\Delta\sigma \div \Delta z$ may be −24 to −1.8 MPa/μm.

According to the third aspect, the value of the residual stress gradient I in the range of the depth from the surface of 0 to 50 μm is −24 to −1.8 MPa/μm. As a result, the compressive residual stress is curbed such that it is small in a range exceeding the depth of 50 μm from the surface, and fatigue strength and sagging resistance can be secured, while imparting a high compressive residual stress to the vicinity of the surface (depth of 0 μm) of the plate spring member.

According to a fourth aspect of the present invention, in the plate spring member of the first or second aspect, when a difference in compressive residual stress between two points having a depth from the surface of 0 μm and 30 μm is defined as $\Delta\sigma$, and a difference in depth from the surface between the two points is defined as $\Delta z$, a value of a residual stress gradient I defined by $I=\Delta\sigma \div \Delta z$ may be −40 to −3 MPa/μm.

According to the fourth aspect, the value of the residual stress gradient I in the range of the depth from the surface of 0 to 30 μm is −40 to −3 MPa/μm. As a result, the compressive residual stress is suppressed to be small in a range exceeding the depth of 30 μm from the surface, and the fatigue strength and the settling resistance can be secured, while imparting a high compressive residual stress to the vicinity of the surface (depth of 0 μm) of the plate spring member.

According to a fifth aspect of the present invention, in the plate spring member of one of the first to third aspects, the plate spring member may be a disc spring formed in an annular shape, the disc spring may have an inner peripheral surface facing inward in a radial direction, an outer peripheral surface facing outward in the radial direction, an inner peripheral edge which is an end surface on the inner side in the radial direction, and an outer peripheral edge which is an end surface on the outer side in the radial direction, the compressive residual stress distribution being imparted to the inner peripheral surface, and the compressive residual stress distribution not being imparted to the outer peripheral surface.

According to the fifth aspect, a large compressive residual stress exceeding 500 MPa is imparted to the vicinity of the surface of the inner peripheral surface of the disc spring, on which a tensile stress acts at the time of operation of the disc spring. In this way, by imparting a compressive residual stress to cancel out the tensile stress that acts when the disc spring operates, the settling resistance of the disc spring can be improved. Further, since a large compressive residual stress exceeding 500 MPa is not imparted to a deep portion of the disc spring having a depth from the surface exceeding 50 μm, a degradation of settling resistance due to the compressive residual stress is suppressed. Therefore, according to the disc spring of the fifth aspect, it is possible to improve the settling resistance in addition to the durability.

According to a sixth aspect of the present invention, the plate spring member of any one of first to third aspects may be a wavy spring in which a plurality of peak parts and a plurality of valley parts are alternately connected in a circumferential direction and formed in an annular shape centered on a central axis, in which the compressive residual stress distribution is imparted to a surface of the peak part closer to the valley part in an axial direction along the central axis, and an upper surface of the valley part closer to the peak part in the axial direction, and no compressive residual stress distribution is imparted to a surface of the peak part farther from the valley part in the axial direction, and a surface of the valley part farther from the peak part in the axial direction.

According to the sixth aspect, it is possible to provide a wavy spring having improved settling resistance in addition to durability.

Advantageous Effects of Invention

According to the present invention, it is possible to provide a plate spring member having improved settling resistance in addition to durability.

DESCRIPTION OF EMBODIMENTS

Figure 1A:
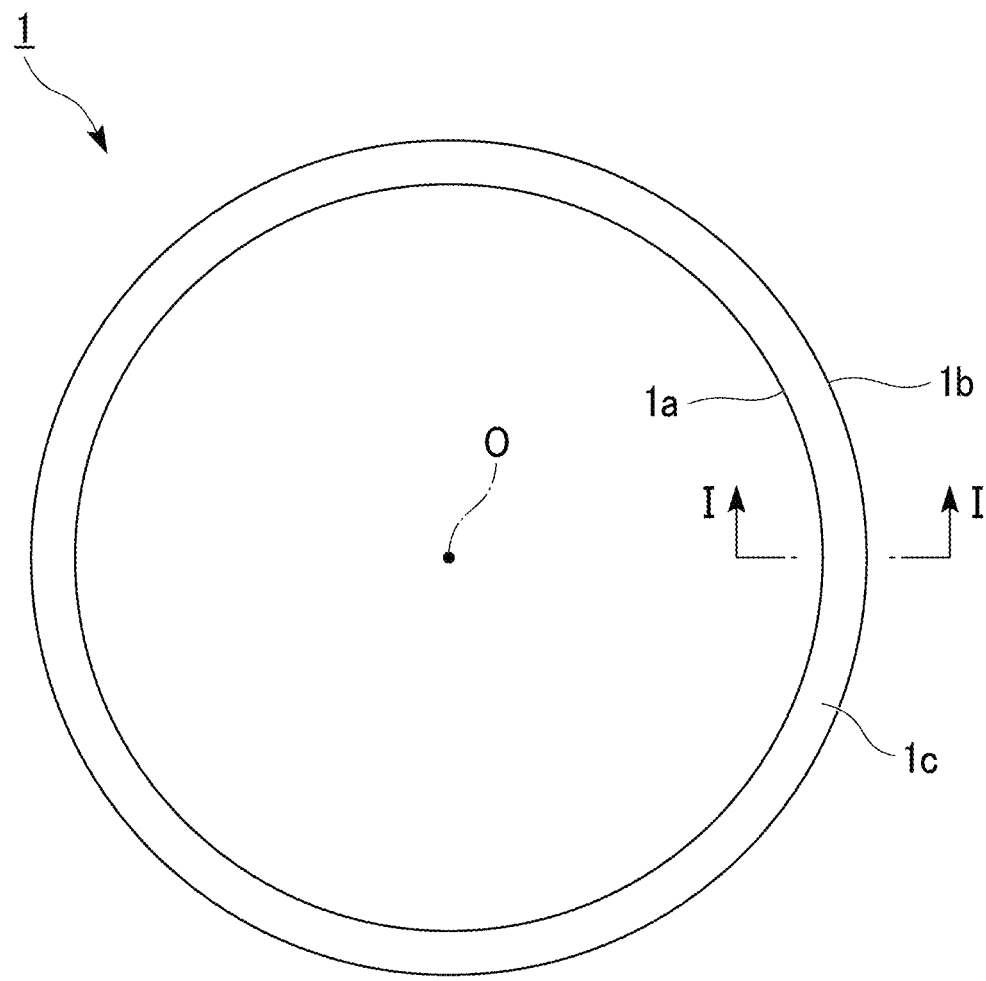
FIG. 1A is a plan view showing a disc spring as an example of a plate spring member according to the present embodiment.

Hereinafter, a plate spring member of this embodiment will be described on the basis of the drawings. As shown in FIG. 1A, in the present embodiment, a disc spring 1 formed in an annular shape will be described as an example of the plate spring member. However, the contents of the present embodiment can be applied to all plate spring members having a front surface and a back surface, which are formed by processing a plate metal material. The plate spring member includes a plate spring, a wavy spring, a spiral spring, and the like, in addition to the disc spring 1.

Figure 1B:
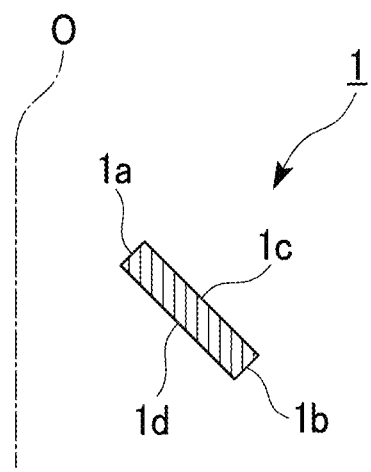
FIG. 1B is a cross-sectional view taken along a line I-I of FIG. 1A.

The disc spring 1 is formed in an annular shape around a central axis O. In the present embodiment, a direction along the central axis O is referred to as an axial direction, and a direction intersecting the central axis O in plan view as seen from the axial direction is referred to as a radial direction. As shown in FIG. 1B, the disc spring 1 has an inner peripheral edge 1a, an outer peripheral edge 1b, an inner peripheral surface 1d, and an outer peripheral surface 1c. The inner peripheral surface 1d faces radially inward, and the outer peripheral surface 1c faces radially outward. The inner peripheral edge 1a is an end surface on the radially inner side of the disc spring 1, and the outer peripheral edge 1b is an end surface on the radially outer side of the disc spring 1.

In general, the disc spring 1 is subjected to a shot peening process. A compressive residual stress is imparted to the surface of the disc spring 1 by the shot peening process. As a result, the fatigue strength of the disc spring 1 can be improved and the durability can be increased. The inventors of the present application have found that not only the durability but also the settling resistance can be improved by appropriately distributing the compressive residual stress in the disc spring 1. The distribution of compressive residual stress will be described below.

Figure 2:
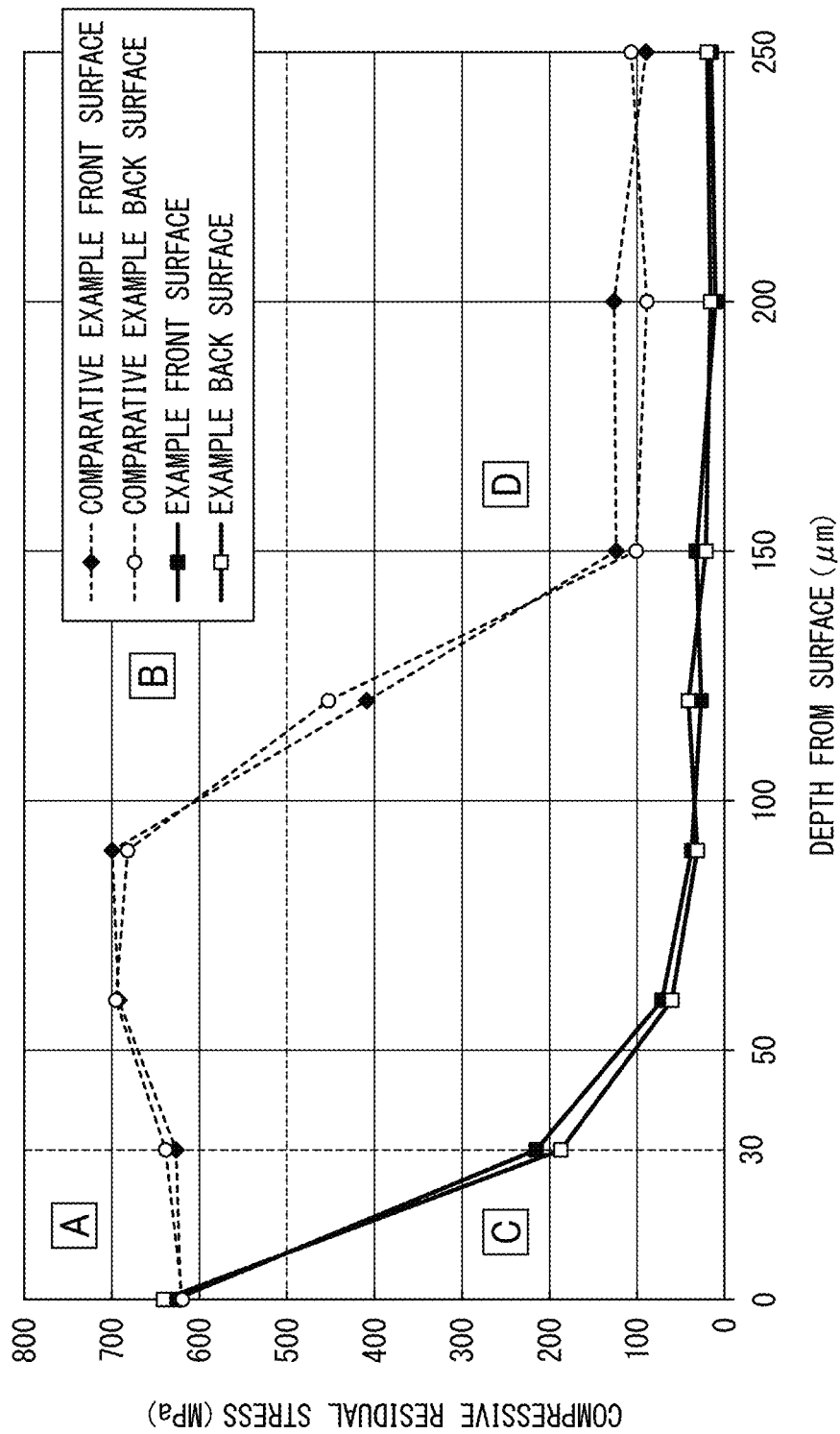
FIG. 2 is a graph showing the distribution of compressive residual stress in an example and a comparative example.

FIG. 2 is a graph showing an example of the compressive residual stress distribution of the disc spring 1. A horizontal axis of the graph of FIG. 2 represents a depth (μm) from the surface of the disc spring 1. A vertical axis of the graph of FIG. 2 represents an absolute value (MPa) of the compressive residual stress. Hereinafter, the depth from the surface of the disc spring 1 will be simply referred to as a "depth". Further, the absolute value of the compressive residual stress is simply referred to as a "residual stress value". In the graph of FIG. 2, quadrants A to D are divided by a straight line having a depth of 50 μm and a straight line having a residual stress value of 500 MPa. Quadrant A has a depth of 50 μm or less and a residual stress value of 500 MPa or more, quadrant B has a depth of 50 μm or more and a residual stress value of 500 MPa or more, quadrant C has a depth of 50 μm or less and a residual stress value of 500 MPa or less, and quadrant D has a depth of 50 μm or more and a residual stress value of 500 MPa or less.

Further, in the present embodiment, an amount of change in the residual stress value with respect to the depth is expressed as a "residual stress gradient I". When a difference in compressive residual stress between two arbitrary points in the graph of FIG. 2 is defined as A and a difference in depth is defined as $\Delta z$, a residual stress gradient I is calculated by the following formula (1). In other words, in the graph of FIG. 2, when the difference in the compressive residual stress between two points having a range of two different depths, that is, two different depths is defined as $\Delta \sigma$, and a difference between two different depths between the two points is defined as $\Delta z$, the residual stress gradient I is calculated by the following formula (1).

$$I = \Delta \sigma \div \Delta z \quad (1)$$

From the formula (1), the residual stress gradient I has a unit of MPa/μm.

(Distribution of Compressive Residual Stress)

The example and the comparative example shown in FIG. 2 show two types of disc springs subjected to a shot peening process under different conditions. Since the conditions of the shot peening process are different between the present example and the comparative example, the distributions of residual stress values are also different. FIG. 2 shows residual stress values of both the front surface (an outer peripheral surface 1c) and the back surface (an inner peripheral surface 1d) for each of the comparative example and the example. In each of the present example and the comparative example, there is a slight difference in the residual stress values between the front surface and the back surface. However, since a shot peening process is performed on the front surface and the back surface under the same conditions in each of the present example and the comparative example, the difference in values is a variation in data.

COMPARATIVE EXAMPLE

In the case of the comparative example, in the range of depth of 0 to 90 μm (0 μm or more and 90 μm or less), the residual stress value tends to slightly rise in the range of about 620 to 700 MPa (about 620 MPa or more and about 700 MPa or less) as the depth increases from the surface. That is, the value of the residual stress gradient I becomes a positive value in the range of depth of 0 to 90 μm. Further, the residual stress value gradually decreases as the depth increases from the vicinity of the depth of 90 μm. For example, in the range of depth of 90 to 150 μm (90 μm or more and 150 μm or less), the value of the residual stress gradient I is about −9.6 MPa/μm, which is a negative value. The graph of the comparative example passes through quadrant A, quadrant B, and quadrant D, and does not pass through quadrant C.

EXAMPLE

In the case of the example, at a depth of 0 μm, that is, on the surface of the disc spring 1, the value of compressive residual stress (the residual stress value) is about 620 MPa, which is equivalent to the comparative example. On the other hand, as the depth increases from 0 μm, the value of the compressive residual stress gradually decreases. At a depth of 30 lam, the value of the compressive residual stress is about 200 MPa, and the value of the residual stress gradient I in the range of depth of 0 to 30 μm (0 μm or more and 30 μm or less) is about −14 MPa/μm. At a depth of 50 μm, the value of the compressive residual stress is about 100 MPa, and the value of the residual stress gradient I in the range of depth of 0 to 50 μm (0 μm or more and 50 μm or less) is about −10 MPa/μm. The value of the residual stress gradient I in the range exceeding the depth of 50 μm becomes smaller than the value of the residual stress gradient I in the range of depth of 0 to 50 μm. In the range of depth of 90 μm or more, the residual stress value is about 20 MPa, and the value of the residual stress gradient I is about 0 MPa/μm. The graph of the example passes through quadrant A, quadrant C, and quadrant D, and does not pass through quadrant B. In other words, in the case of the example, at the depth of 0 μm, that is, on the surface of the disc spring 1, the value of the compressive residual stress (the residual stress value) is about 620 MPa, which is equivalent to the comparative example. On the other hand, at a depth of 30 lam, the value of the compressive residual stress is about 200 MPa, and the value of the residual stress gradient I between two points at the depths of 0 μm and 30 μm is about −14 MPa/μm. At a depth of 50 μm, the value of the compressive residual stress is about 100 MPa, and the value of the residual stress gradient I between two points having a depth of 0 μm or more and 50 μm is about −10 MPa/μm. The value of the residual stress gradient I between the two points having a depth exceeding 0 μm and 50 μm becomes smaller than the value of the residual stress gradient I between the two points having a depth of 0 μm and 50 μm. In the range of depth of 90 μm or more, the residual stress value is about 20 MPa, and the value of the residual stress gradient I between the two points having the depth of 0 μm and 90 μm or more is about 0 MPa/μm. The graph of the example passes through quadrant A, quadrant C, and quadrant D, and does not pass through quadrant B.

(Settling Test)

The following Table 1 shows the result of a settling test on a plurality of samples subjected to the shot peening process under the same conditions as those of the above-mentioned example and comparative example. In the settling test, first, each sample is elastically deformed by a certain amount, and the load at that time is measured and recorded as a first load. Next, after elastically deforming each sample by a predetermined amount in a high temperature environment and leaving it for 24 hours, each sample is elastically deformed by the certain amount, and the load at that time is measured and recorded as a second load. A load reduction rate in Table 1 below shows the reduction rate of the second load with respect to the first load. For example, when the load reduction rate is 10%, this shows that the value of the second load is a value that has decreased by 10% from the value of the first load.

TABLE 1

| | LOAD REDUCTION RATE | |
| --- | --- | --- |
| | EXAMPLE | COMPARATIVE EXAMPLE |
| SAMPLE 1 | 6.8% | 9.9% |
| SAMPLE 2 | 7.0% | 9.8% |
| SAMPLE 3 | 5.9% | 10.9% |
| AVERAGE VALUE | 6.6% | 10.2% |

As shown in Table 1, in the comparative example, the average value of the load reduction rate was 10.2%. In contrast, in the example, the average value of the load reduction rate was 6.6%. In this way, in the example, the load reduction rate is better as compared with the comparative example. This is thought to be related to a difference in distribution of residual stress values. That is, when the compressive residual stress is imparted to the inside of the metal, dislocation occurs in a portion inside the metal to which the compressive residual stress is imparted. It is thought that movement of the dislocation due to an external force causes plastic deformation even though the deformation would inherently have been in an elastic region, and the load (elastic force) due to the deformation is reduced. Further, in the example, it is considered that the load reduction rate can be suppressed to be small because the range in which the high compressive residual stress is imparted is small as compared with the comparative example. Specifically, in the comparative example, a large compressive residual stress of 500 MPa or more is imparted in a range exceeding a relatively deep depth of 50 μm. On the other hand, in the examples, the compressive residual stress of 500 MPa or more is not imparted at the depth exceeding 50 μm. As a result, it is considered that, as shown in Table 1, in the example, the load reduction rate can be suppressed to be smaller than that in the comparative example.

(Fatigue Test)

Figure 3:
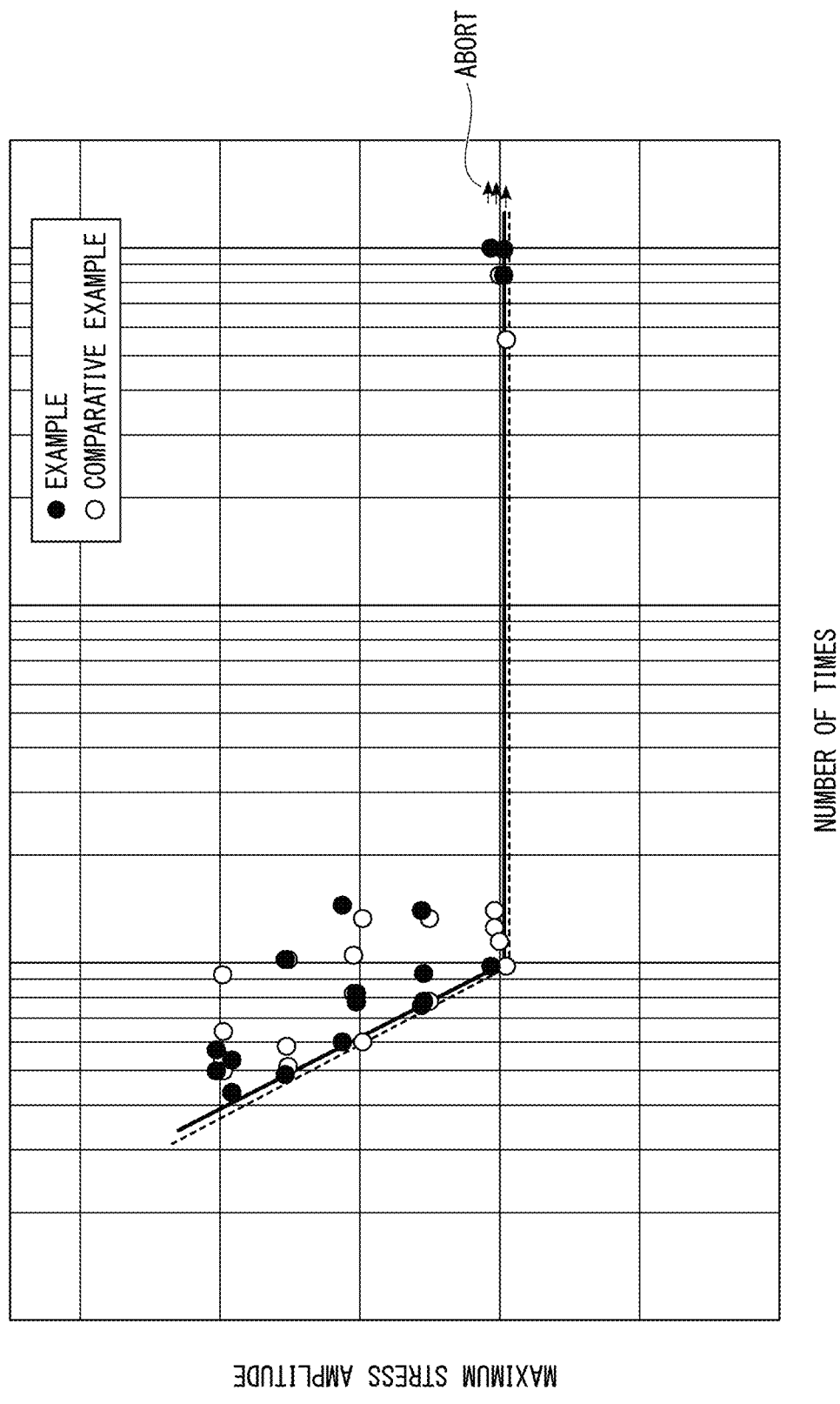
FIG. 3 is an S-N diagram of the example and the comparative example.

FIG. 3 is an SN diagram. The graph shown in FIG. 3 shows the results of fatigue tests performed on a plurality of flat plate samples subjected to the shot peening process under the same conditions as those of the above-mentioned example and comparative example. The conditions of the fatigue test are a constant stress amplitude, a room temperature environment, 25 Hz, and a stress ratio of 0. A horizontal axis of FIG. 3 represents the number of repetitions when breakage occurs as a result of the fatigue test. A vertical axis of FIG. 3 represents a maximum value (a maximum stress amplitude) in the stress amplitude applied to the sample. The test is aborted when no breakage occurs even after the number of repetitions reaches 10 million times.

A solid line shown in FIG. 3 is obtained by connecting the plots located at the lowermost side of the test results of the examples. Similarly, a broken line shown in FIG. 3 is obtained by connecting the plots located on the lowermost side of the test results of the comparative example. Since the solid line and the broken line substantially overlap each other, it is understood that the sample of the example has the same fatigue strength as the sample of the comparative example. That is, although the range in the example to which a high compressive residual stress is imparted is smaller than that of the comparative example (see FIG. 2), the same fatigue strength as in the comparative example was maintained in the example even with such a compressive residual stress distribution.

As described above, in the disc spring 1 of the embodiment, at least part of the portion having a depth from the surface within 50 μm has a compressive residual stress of 500 MPa or more, and the portion having a depth from the surface exceeding 50 μm has a compressive residual stress of less than 500 MPa. As a result, the sagging resistance is better in the example, as compared with the comparative example, while a fatigue strength equivalent to that of the comparative example is maintained. When the range to which the compressive residual stress of 500 MPa or more is imparted is set to the depth from the surface within 30 μm (preferably within 20 μm, more preferably within 10 μm), the settling resistance can be more reliably improved.

Further, in the example, when the value of the residual stress gradient I in the range of depth of 0 to 50 μm is set to about −10 MPa/μm, the compressive residual stress in the range exceeding the depth of 50 μm is suppressed to be small, and the fatigue strength and the settling resistance are secured, while imparting a high compressive residual stress to the vicinity of the surface (depth of 0 μm) of the disc spring 1. The value of the residual stress gradient I in the range of depth of 0 to 50 μm is not limited to the aforementioned value. For example, in the range of −24 to −1.8 MPa/μm (−24 MPa/μm or more and −1.8 MPa/μm or less), the same operating effect can be obtained. In addition, by setting the value of the residual stress gradient I in the range of depth of 0 to 30 μm within the range of −40 to −3 MPa/μm (−40 MPa/μm or more and −3 MPa/μm or less), the fatigue strength and the settling resistance can be more reliably secured. In other words, in the example, by setting the value of the residual stress gradient I between the two points having the depths of 0 μm and 50 μm to about −10 MPa/μm, the compressive residual stress in the range exceeding the depth of 50 μm is suppressed to be small, and the fatigue strength and settling resistance are secured, while imparting a high compressive residual stress to the vicinity of the surface of the disc spring 1 (depth of 0 μm). The value of the residual stress gradient I between two points having a depth of 0 μm and 50 μm is not limited to the aforementioned value. If the value of the residual stress gradient I between two points having a depth of 0 μm and 50 μm is, for example, within the range of −24 to −1.8 MPa/μm (−24 MPa/μm or more and −1.8 MPa/μm or less), similar operating effects can be obtained. Further, by setting the value of the residual stress gradient I between the two points having the depths of 0 μm and 30 μm within the range of −40 to −3 MPa/μm (−40 MPa/μm or more and −3 MPa/μm or less), it is possible to more reliably secure the fatigue strength and settling resistance.

The technical scope of the present invention is not limited to the above embodiment, and various modifications can be made without departing from the spirit of the present invention.

For example, in FIG. 2, although the depth from the surface of the front surface (the outer peripheral surface 1c) or the back surface (the inner peripheral surface 1d) of the disc spring 1 is set as the horizontal axis, the depth from an arbitrary surface of the disc spring 1 may be set as the horizontal axis. By forming the compressive residual stress distribution as shown in FIG. 2 for such a depth, both the fatigue strength and the settling resistance can be secured on the arbitrary surface.

Further, in the above-described embodiment, although the compression residual stress distribution as shown in FIG. 2 is formed on the entire surface of the disc spring 1, a part of the disc spring 1 may have such a compression residual stress distribution. For example, when the disc spring 1 operates, the compressive stress may act on the outer peripheral surface 1c shown in FIG. 1B, and meanwhile, the tensile stress acts on the inner peripheral surface 1d. Further, if a compressive stress at the time of operation of the disc spring 1 is further imparted to a portion to which the compressive residual stress is imparted, settling easily occurs. Therefore, by imparting the compressive residual stress distribution to the inner peripheral surface 1d and by not imparting the compressive residual stress distribution to the outer peripheral surface 1c, it is possible to further suppress the occurrence of settling. Similarly, also in the plate spring members other than the disc spring 1, the compressive residual stress distribution as described above may be imparted to at least a portion on which the tensile stress acts when the disc spring 1 operates.

Figure 4:
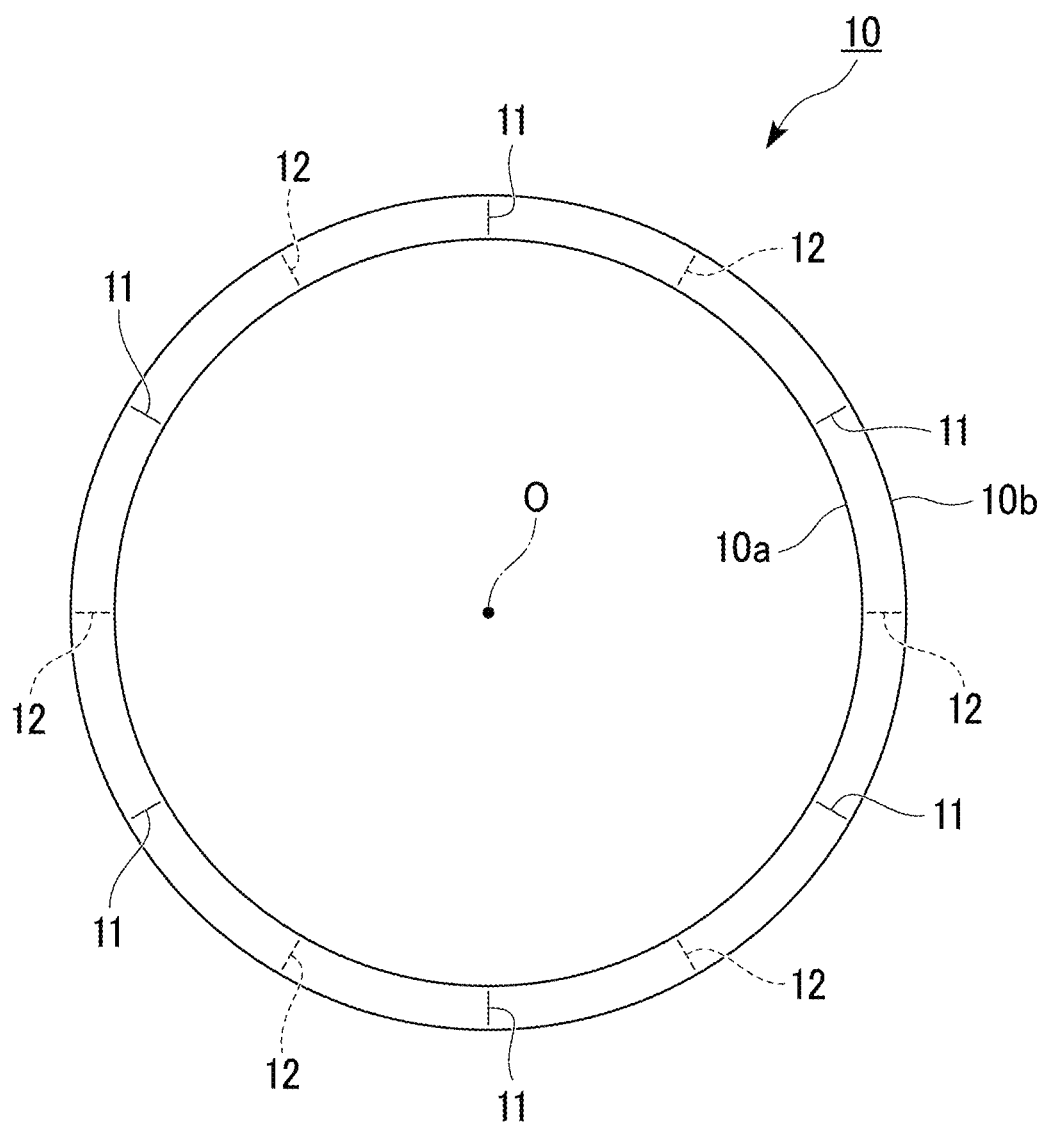
FIG. 4 is a plan view showing a wavy spring as an example of a plate spring member.

Further, a wavy spring 10 as shown in FIG. 4 may be used as the plate spring member. The wavy spring 10 is formed in an annular shape centering on the central axis O, and is formed by alternately circumferentially connecting a plurality of peak parts 11 protruding to one side and a plurality of valley parts 12 protruding to the other side in the axial direction along the central axis O. Although not shown, the wavy spring 10 may have a claw portion that extends radially inward from the inner peripheral edge 10a or a claw portion that extends radially outward from the outer peripheral edge 10b.

When the wavy spring 10 operates, compressive stress acts on the upper surface of the peak part 11 and the lower surface of the valley part 12 in plan view seen from the direction in which the peak part 11 protrudes, and the tensile stress acts on the lower surface of the peak part 11 and the upper surface of the valley part 12. In the present embodiment, in the wavy spring 10, a side on which the peak part 11 is provided in the axial direction along the central axis O is referred to as an upper side, and a side on which the valley part 12 is provided in the axial direction along the central axis O is referred to as a lower side. Based on this, by imparting the aforementioned compressive residual stress distribution to the lower surface of the peak part 11 and the upper surface of the valley part 12 on which the tensile stress acts, and by not imparting such a compressive residual stress distribution to the upper surface of the peak part 11 and the lower surface of the valley part 12, it is possible to further suppress the occurrence of settling. In other words, when the wavy spring 10 is compressed in the axial direction along the central axis O, the compressive stress acts on a surface (the front surface) of the peak part 11 facing the protruding direction of the peak part 11, and a surface (the back surface) of the valley part 12 facing the protruding direction of the valley part 12, and the tensile stress acts on a surface (the back surface) of the peak part 11 facing a direction opposite to the protruding direction of the peak part 11, and a surface (front surface) of the valley part 12 facing a direction opposite to the protruding direction of the valley part 12. Based on this, by imparting the compressive residual stress distribution to the back surface of the peak part 11 and the front surface of the valley part 12 on which the tensile stress acts, and by not imparting such compressive residual stress distribution to the front surface of the peak part 11 and the back surface of the valley part 12, it is possible to further suppress the occurrence of settling. In other words, when the wavy spring 10 is compressed in the axial direction along the central axis O, the compressive stress acts on a surface (the front surface) of the peak part 11 farther from the valley part 12 in the axial direction along the central axis O, and a surface (the back surface) of the valley part 12 farther from the peak part 11 in the axial direction along the central axis O, and the tensile stress acts on a surface (the back surface) of the peak part 11 closer to the valley part 12 in the axial direction along the central axis O, and a surface (the front surface) of the valley part 12 closer to the peak part 11 in the axial direction along the central axis O. Therefore, by imparting the compressive residual stress distribution to the front surface of the peak part 11 and the back surface of the valley part 12 on which the tensile stress acts, and by not imparting such a compressive residual stress distribution to the front surface of the peak part 11 and the back surface of the valley part 12, it is possible to further suppress the occurrence of settling.

Further, the constituent elements in the above-described embodiments may be replaced with known constituent elements without departing from the spirit of the present invention.

INDUSTRIAL APPLICABILITY

According to the present invention, it is possible to provide a plate spring member having improved settling resistance in addition to durability.

REFERENCE SIGNS LIST

1 Disc spring (plate spring member)
1a Inner peripheral edge
1b Outer peripheral edge
1c Outer peripheral surface
1d Inner peripheral surface
10 Wavy spring (plate spring member)
11 Peak part
12 Valley part
O Central axis

The invention claimed is:

1. A plate spring member comprising:
a compressive residual stress distribution in which a compressive residual stress of at least part of a portion having a depth from a surface within 50 μm is 500 MPa or more, and the compressive residual stress of all portions having a depth from the surface exceeding 50 μm is less than 500 MPa,
wherein when a difference in compressive residual stress between two points having a depth from the surface of 0 μm and 30 μm is defined as $\Delta\sigma$, and a difference in depth from the surface between the two points is defined as $\Delta z$, a value of a residual stress gradient I defined by $I=\Delta\sigma\div\Delta z$ is −40 to −3 MPa/μm.

2. The plate spring member according to claim 1, wherein the plate spring member includes a compressive residual stress distribution in which the compressive residual stress of at least part of a portion having a depth from the surface within 30 μm is 500 MPa or more, and the compressive residual stress of a portion having a depth from the surface exceeding 30 μm is less than 500 MPa.

3. The plate spring member according to claim 1, wherein the plate spring member is a disc spring formed in an annular shape,
the disc spring has
an inner peripheral surface facing an inner side in a radial direction,
an outer peripheral surface facing an outer side in the radial direction,
an inner peripheral edge which is an end surface on the inner side in the radial direction, and
an outer peripheral edge which is an end surface on the outer side in the radial direction,
the compressive residual stress distribution being imparted to the inner peripheral surface, and the compressive residual stress distribution not being imparted to the outer peripheral surface.

4. The plate spring member according to claim 1, wherein the plate spring member is a wavy spring in which a plurality of peak parts and a plurality of valley parts are alternately connected in a circumferential direction and formed in an annular shape centered on a central axis, and
the compressive residual stress distribution is imparted to a surface of the peak part closer to the valley part in an axial direction along the central axis, and a surface of the valley part closer to the peak part in the axial direction, and no compressive residual stress distribution is imparted to a surface of the peak part farther from the valley part in the axial direction, and a surface of the valley part farther from the peak part in the axial direction.

5. A plate spring member comprising:
a compressive residual stress distribution in which a compressive residual stress of at least part of a portion having a depth from a surface within 50 μm is 500 MPa or more, and the compressive residual stress of a portion having a depth from the surface exceeding 50 μm is less than 500 MPa, and
wherein when a difference in compressive residual stress between two points having a depth from the surface of 0 μm and 30 μm is defined as $\Delta\sigma$, and a difference in depth from the surface between the two points is defined as $\Delta z$, a value of a residual stress gradient I defined by $I=\Delta\sigma\div\Delta z$ is −40 to −3 MPa/μm,
the compressive residual stress of a first point of the two points having the depth from the surface of 0 μm is 500 MPa or more, and the compressive residual stress of a second point of the two points having the depth from the surface of 30 μm is less than 500 MPa, and
a value of the compressive residual stress between the two points gradually decreases as the depth from the surface increases from 0 μm.

6. A plate spring member comprising:
a compressive residual stress distribution in which a compressive residual stress of at least part of a portion having a depth from a surface within 30 μm is 500 MPa or more, and the compressive residual stress of a portion having a depth from the surface exceeding 30 μm is less than 500 MPa, and wherein when a difference in compressive residual stress between two points having a depth from the surface of 0 μm and 30 μm is defined as $\Delta\sigma$, and a difference in depth from the surface between the two points is defined as $\Delta z$, a value of a residual stress gradient I defined by $I=\Delta\sigma \div \Delta z$ is −40 to −3 MPa/μm, the compressive residual stress of a first point of the two points having the depth from the surface of 0 μm is 500 MPa or more, and the compressive residual stress of a second point of the two points having the depth from the surface of 30 μm is less than 500 MPa, and a value of the compressive residual stress between the two points gradually decreases as the depth from the surface increases from 0 μm.

* * * * *